(12) United States Patent
Asada et al.

(10) Patent No.: US 7,466,169 B2
(45) Date of Patent: Dec. 16, 2008

(54) SIGNAL DETECTING DEVICE AND METHOD FOR INDUCTIVE LOAD

(75) Inventors: Tadatoshi Asada, Anjo (JP); Susumu Ueda, Okazaki (JP)

(73) Assignee: DENSO CORPORATION, Kariya (JP)

( * ) Notice: Subject to any disclaimer, the term of this patent is extended or adjusted under 35 U.S.C. 154(b) by 138 days.

(21) Appl. No.: 11/513,218

(22) Filed: Aug. 31, 2006

(65) Prior Publication Data

US 2007/0103840 A1 May 10, 2007

(30) Foreign Application Priority Data

Sep. 26, 2005 (JP) ............................. 2005-277796

(51) Int. Cl.
*H03K 3/00* (2006.01)
(52) U.S. Cl. ....................... 327/110; 327/332
(58) Field of Classification Search ................. 327/110, 327/306, 331, 332; 322/22–25
See application file for complete search history.

(56) References Cited

U.S. PATENT DOCUMENTS

| 5,198,744 | A | | 3/1993 | Kohl et al. | |
|---|---|---|---|---|---|
| 5,521,486 | A | | 5/1996 | Takamoto et al. | |
| 5,886,500 | A | * | 3/1999 | Iwatani et al. | 320/104 |
| 5,966,001 | A | * | 10/1999 | Maehara et al. | 322/28 |
| 6,005,372 | A | * | 12/1999 | Kouwa et al. | 322/25 |
| 6,042,632 | A | | 3/2000 | George | |
| 6,137,247 | A | * | 10/2000 | Maehara et al. | 318/140 |
| 6,249,094 | B1 | | 6/2001 | Zeh et al. | |
| 6,294,899 | B1 | * | 9/2001 | Tokugawa et al. | 322/28 |
| 6,777,905 | B2 | * | 8/2004 | Maehara | 318/650 |
| 7,235,952 | B2 | * | 6/2007 | Maehara | 322/24 |
| 2003/0178973 | A1 | * | 9/2003 | Maehara | 322/27 |

FOREIGN PATENT DOCUMENTS

| DE | 10 347 208 A1 | 5/2004 |
|---|---|---|
| JP | A-06-070599 | 3/1994 |
| JP | A-2002-171688 | 6/2002 |

* cited by examiner

*Primary Examiner*—Lincoln Donovan
*Assistant Examiner*—Hai L. Nguyen
(74) *Attorney, Agent, or Firm*—Posz Law Group, PLC

(57) ABSTRACT

A signal detecting device detects, as analog voltage signals, a current flowing through an exciting coil of an electric power generator, a source voltage and a temperature of a regulator that change as a current is fed to the exciting coil by an FET. These analog voltage signals are subjected to A/D conversion by a single A/D converter circuit. The detected current is subjected to A/D conversion in a period during which the FET is ON, while the detected source voltage and the detected temperature are subjected to A/D conversion in a period during which the FET is OFF.

11 Claims, 5 Drawing Sheets

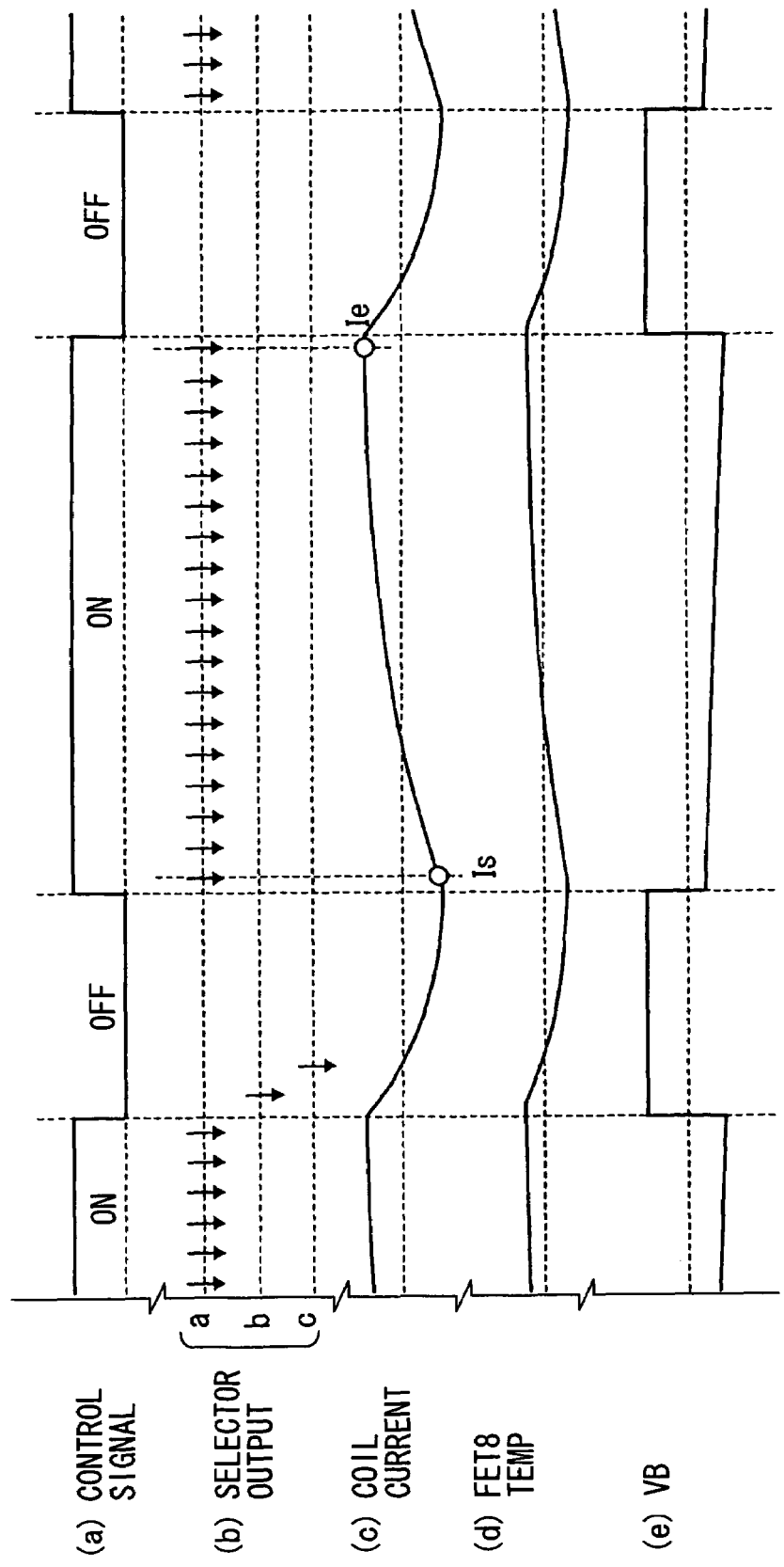

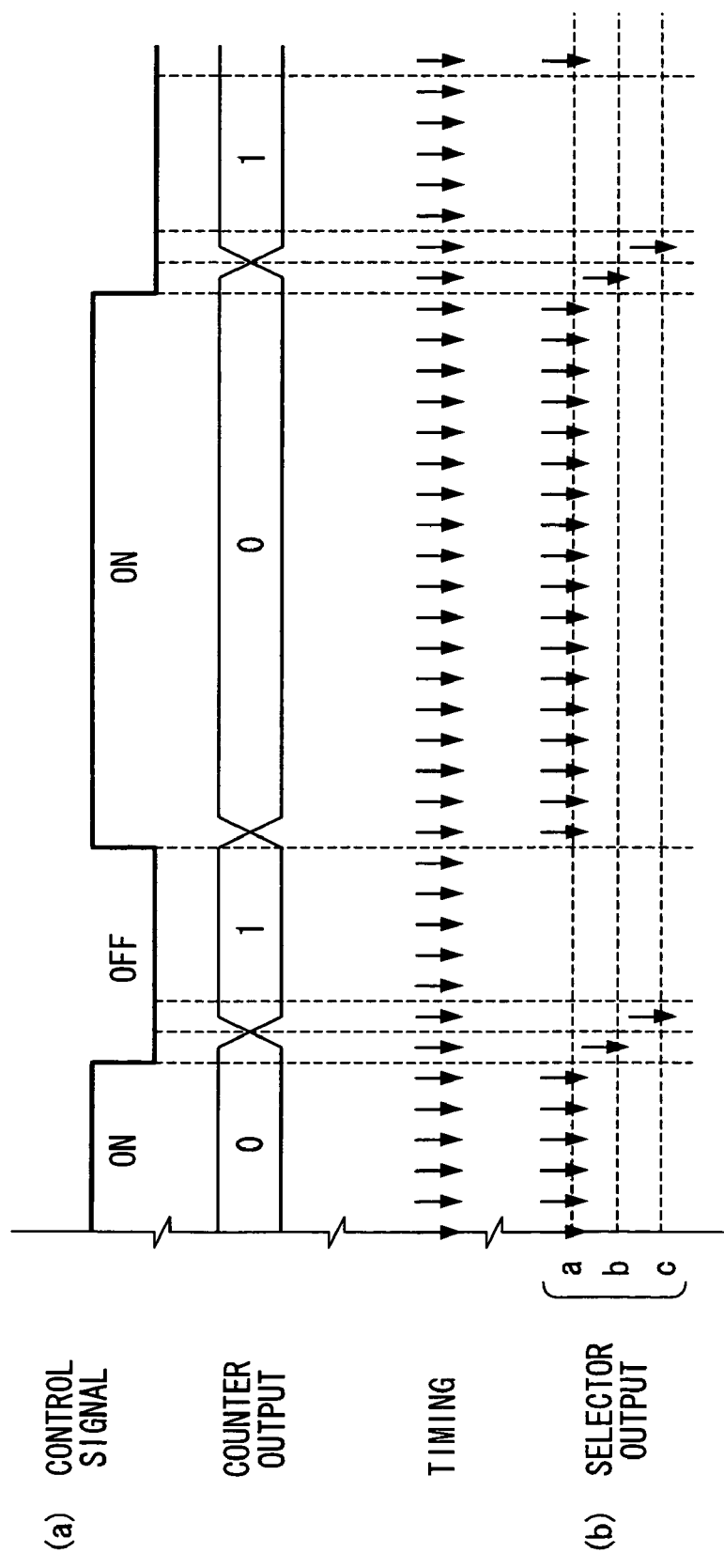

US 7,466,169 B2

SIGNAL DETECTING DEVICE AND METHOD FOR INDUCTIVE LOAD

CROSS REFERENCE TO RELATED APPLICATION

This application is based on and incorporates herein by reference Japanese Patent Application No. 2005-277796 filed on Sep. 26, 2005.

FIELD OF THE INVENTION

The present invention relates to a signal detecting device and method used in a load driving apparatus that controls a current to an inductive load by alternately turning on and off the current supply by a switching element to drive the load.

BACKGROUND OF THE INVENTION

JP-2002-171688A discloses A/D conversion of currents fed to coils of a charging generator. Further U.S. Pat. No. 5,521,486 (JP-7-184330A) and JP-6-70599A disclose A/D conversion of currents and other parameters in an electric power generator to monitor an abnormality by a CPU.

However, an attempt to monitor many detection parameters by using a CPU as in the above technologies to detect an abnormality in equipment inevitably results in increasing the scale of A/D converter circuits and I/O circuits. Accordingly, the sizes of elements such as a microcomputer including a CPU increase, leading to an increase in cost. In the case of detecting an abnormality in equipment used in relatively hot environments such as an electric power generator mounted in a vehicle, malfunction may occur due to a leak current of circuit elements. Furthermore, circuits mounted in a vehicle are required to have very high reliability, and an increase in the circuit size would adversely affect the reliability.

SUMMARY OF THE INVENTION

An object of the present invention is to efficiently detect plural signals generated during operation of a load driving apparatus for driving inductive loads, with a simple construction.

According to an aspect of the present invention, a signal detecting device controls a current to an inductive load by intermitting a current by a switching element to drive the load. The signal detecting device detects the current flowing through the load and a state amount other than the current. The signal detecting device has an A/D converter circuit that subjects the detected current and the detected state amount to A/D conversion. The A/D converter circuit performs A/D conversion of the detected current when the current is supplied to the inductive load, and performs A/D conversion of the detected state amount when the current is not supplied to the inductive load.

BRIEF DESCRIPTION OF THE DRAWINGS

The above and other objects, features and advantages of the present invention will become more apparent from the following detailed description made with reference to the accompanying drawings. In the drawings:

FIG. 4 is a timing chart showing voltage waveforms and the like of various signals developed in the embodiment;

FIG. 7 is a timing chart showing voltage waveforms produced by the selector shown in FIG. 6.

DETAILED DESCRIPTION OF THE EMBODIMENT

Figure 1:
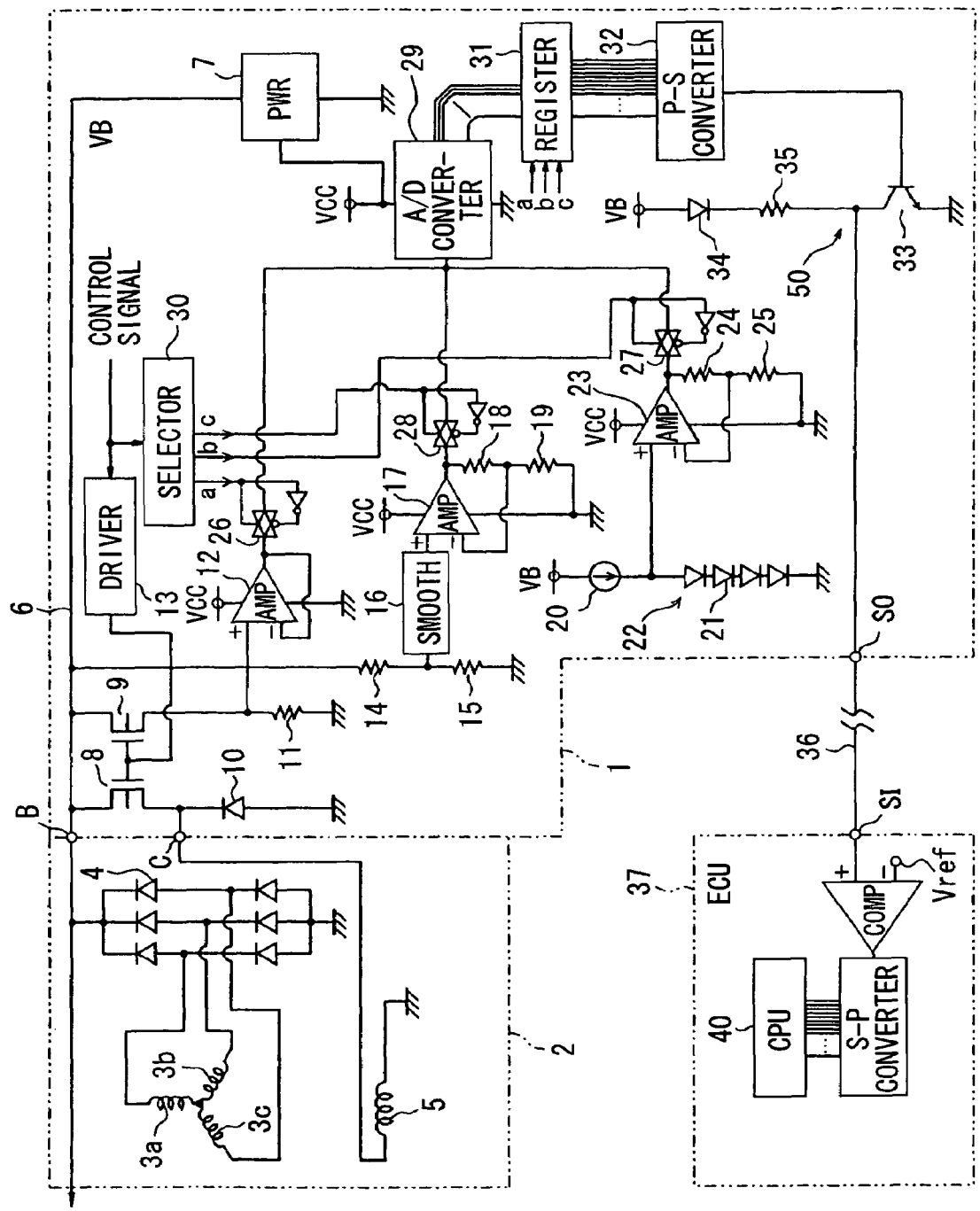
FIG. 1 is an electric circuit diagram showing a vehicle electric power generator system in an embodiment of the present invention.

Referring to FIG. 1, a vehicle electric power generator system includes a regulator 1 as a load driving apparatus and signal detecting device, and a vehicle electric power generator (alternator) 2. The regulator 1 is provided to control a voltage of an output terminal (B-terminal) of the vehicle generator 2 so that it becomes equal to a predetermined regulation voltage setting value (e.g., 14 V).

The vehicle generator 2 comprises: three-phase stator coils 3a, 3b, 3c included in a stator; a rectifying circuit 4 provided to rectify a full wave on three-phase outputs of these stator coils 3a to 3c; and an exciting coil 5 (inductive load) included in a rotor. The vehicle generator 2 is rotationally driven by an engine of a vehicle (not shown). Its output voltage control is performed by the regulator 1 by intermitting, that is, alternately turning on and off, an electric current to the exciting circuit 5. The output terminal (B-terminal) of the generator 2 is connected to a power source 7 including a battery via a power line 6. A charging current is supplied to the power source 7 from the B-terminal. The power source 7 supplies electric power VB of 14V to each part via the power line 6.

In the regulator 1, the drains of N-channel MOSFETs (switching elements) 8 and 9 are connected to the power line 6, and the source of the FET 8 is connected to the exciting coil 5 of the generator 2 via a control terminal C and connected to the ground via a flywheel diode 10. The source of the FET 9 is connected to the ground via a resistor 11 to detect current, and also connected to the non-inversion input terminal of an operational amplifier 12 constituting a voltage buffer. The gates of the FETs 8 and 9 are connected in common, and supplied with a control signal via a driver 13. The ratio of currents flowing through the FETs 8 and 9 is set to be, for example, approximately 1000 to 1. Therefore, when the FET 8 is turned on, a current is supplied from the power source 7 to the exciting coil 5 of the generator 2, at which time the current flows through the FETs 9 and 8 at a ratio of 1 to 1000, and is supplied to the resistor 11.

The power line 6 is connected to the ground via a series circuit of resistors 14 and 15. The common junction of the resistors 14 and 15 is connected to the non-inversion input terminal of an operational amplifier 17 via a smoothing circuit 16 to detect operation state. The smoothing circuit 16 comprises a capacitor for smoothing and a CR integration circuit. The operational amplifier 17 constitutes a non-inverting amplifier. Its output terminal is connected to the ground via a series circuit of resistors 18 and 19, and The common junction of the resistors 18 and 19 is connected to its inversion input terminal.

Between the power supply VB and the ground, a temperature sensor 22 comprising a series circuit of a current source 20 and plural diodes 21 is connected to detect temperature state. The common junction of the current source 20 and the anode of the diodes 21 is connected to the non-inversion input terminal of an operational amplifier 23. The operational amplifier 23 constitutes a non-inverting amplifier like the operational amplifier 17. Its output terminal is connected to the ground via a series circuit of resistors 24 and 25. The common junction of the resistors 24 and 25 is connected to its inversion input terminal.

The temperature sensor 22 is constructed so that a divided potential at the common junction with the current source 20 changes according to temperatures due to temperature characteristics of the diodes 21. The temperature sensor 22 is disposed in the vicinity of the FET 8 to detect the temperature state of the FET, which is a primary heating source.

Output terminals of the operational amplifiers 12, 23 and 17 are connected in common to the input port of an A/D converter circuit 29 via analog switches 26, 27 and 28, respectively. On-off control of the three analog switches 26, 27 and 28 is performed by select signals a, b and c outputted from a selector 30. The same control signals as those to the driver 13 are fed to the selector 30. Power supply VCC of, e.g., 5V is supplied to the operational amplifiers 12, 17 and 23, and the A/D converter circuit 29.

The A/D converter circuit 29 has outputs of eight bits, and eight-bit data subjected to A/D conversion is outputted to a register 31. The select signals a, b and c outputted from the selector 30 are fed to the register 31. When any one of them has become active, an area for storing data outputted from the A/D converter circuit 29 is switched.

Output data of the register 31 is fed to a parallel input terminal of a parallel-serial converter circuit 32. The parallel-serial converter circuit 32 converts eight-bit parallel data outputted from the register 31 into serial data, and then outputs the converted data to the base of an NPN transistor 33. The transistor 33 forms a driver 50 for serial communication, its collector is supplied with the power supply VB via a diode 34 and a resistor 35, and its emitter is connected to the ground. The collector of the transistor 33 is connected to the serial input terminal SI of an ECU 37, which performs determination processing, via a serial output terminal SO of the regulator 1 and a communications line 36.

The ECU 37 is disposed away from the regulator 1 via the communication 36. In the interior of the ECU 37, the input terminal (+) of a comparator 38 is connected to a serial input terminal SI. A reference voltage Vref is fed to the input terminal (−) of the comparator 38. The output terminal of the comparator 38 is connected to the serial input terminal of a serial-parallel converter circuit 39. The serial-parallel converter circuit 39 converts serial data inputted from the comparator 38 into parallel data, and outputs the parallel data to a CPU 40, which calculates a current value.

Figure 2:
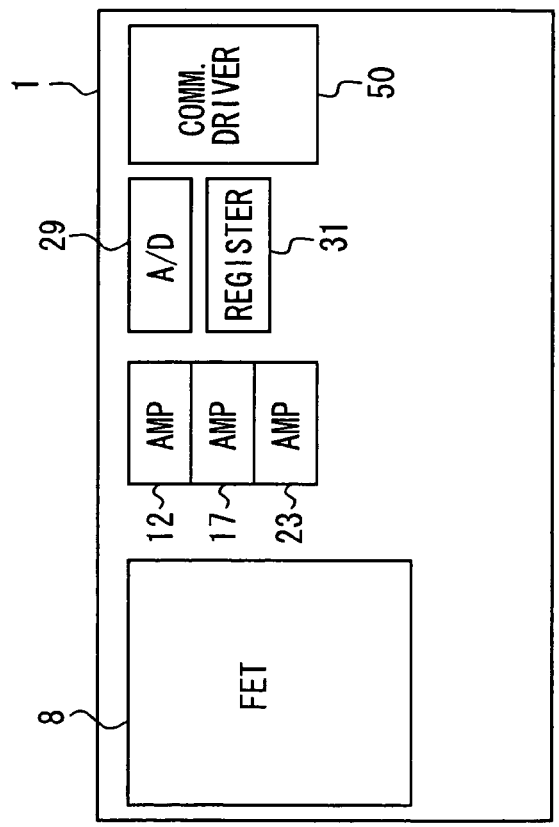
FIG. 2 is an electric circuit diagram schematically showing a layout of main circuit elements of the regulator.

The circuits of the regulator 1 are arranged as shown in FIG. 2. On the left side of FIG. 2, the FET 8 that generates the largest amount of heat is disposed, and at some distance from the FET 8, three operational amplifiers 12, 17 and 23 are disposed adjacently to each other. On the right side of them, the A/D converter circuit 29 and the register 31 are disposed. On the further right side of them, the transistor 33, diode 34, and resistor 35 that constitute the communication driver 50 are disposed.

Figure 3:
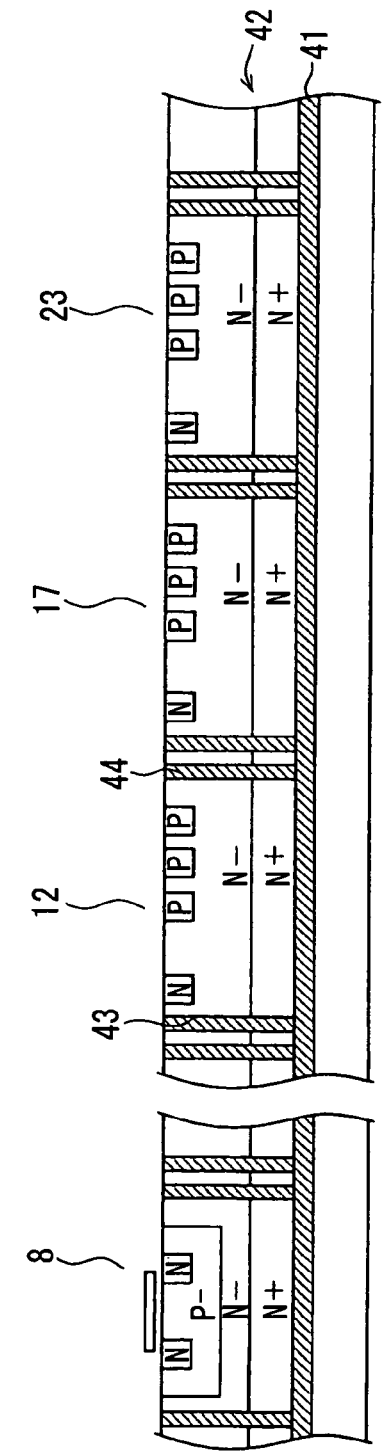
FIG. 3 is a schematic sectional view showing the regulator as an LSI at a semiconductor level.

The circuits of the regulator 1 are formed on an SOI (Silicon On Insulator) substrate 42 having a buried oxide film ($SiO_2$) 41 as shown in FIG. 3. FIG. 3 shows only part of circuits that constitute the FET 8 and the operational amplifiers 12, 17 and 23. They are respectively formed in trench-separated areas formed by burying oxide film materials 44 in trenches 43 that reach the buried oxide film 41. Accordingly, the operational amplifiers 12, 17 and 23 that are disposed adjacently are electrically insulated from each other.

The above embodiment performs the following operation, which are shown in FIG. 4. The control signal is outputted as shown in (a) of FIG. 4 to change alternately at a predetermined ratio a high level period and a low level period. Thus, an electric current to the exciting coil 5 of the vehicle generator 2 is intermitted in a period of, e.g., about 5 to 10 ms. The output cycle of the control signal is set to about 1/10 of a time constant of the rotor of the generator 2 including the exciting coil 5. Specifically, while the engine is rotating, a current fed to the exciting coil 5 is controlled as described above to control a generated voltage of the generator 2 so that it becomes equal to a voltage VB (=14V) of the power source 7.

As shown in (b) of FIG. 4, in a high level period of the control signal in which a current is fed to the exciting coil 5, the selector 30 activates a select signal a so that only the analog switch 26 is turned on. Immediately after the control signal changes from the high level to a low level, it activates only the select signal b, and after some lapse of time, activates only a select signal c, thus changing output states of the select signal.

When the FET 8 turns, as shown in (c) of FIG. 4, a current flowing through the exciting coil 5 starts to increase gently due to its inductance. It peaks immediately before the FET 8 changes from ON to OFF, and when the FET 8 turns off, a lagging current flows via the flywheel diode 10, and a current level decreases.

While the FET 8 is turned on, since the output signal of the operational amplifier 12 is fed to the input port of the A/D converter circuit 29 via the analog switch 26, a conducting current of the exciting coil 5 is subjected to A/D conversion by the A/D converter circuit 29. The digital data is transmitted to the ECU 37 via the register 31, the parallel-serial converter circuit 32, and the communication driver 50.

The CPU 40 of the ECU 37 acquires a current value Is subjected to A/D conversion immediately after the control signal turns into the high level and the feeding of the current to the exciting coil 5 is started, and a current value Ie subjected to A/D conversion immediately before the control signal changes from the high level to the low level, that is, the exciting coil 5 is deenergized. The CPU 40 calculates an average of the current by using the averaging expression, that is, $I=(Is+Ie)/2$.

Specifically, as shown in (c) of FIG. 4, since a conducting current of the exciting coil 5 changes gently according to its inductance, an appropriate detected current value I can be obtained by averaging the low current value Is immediately after the feeding is started, and the current value Ie immediately before the deenergization.

As shown in (d) of FIG. 4, temperatures of the FET 8 detected by the temperature sensor 22, which change as a conducting current of the exciting coil 5 changes, rise in a period during which the current flows via the FET 8, and fall in a period during which no current flows through the FET 8. When the select signal b outputted by the selector 30 when the FET 8 is turned off becomes active, the output signal of the operational amplifier 23 is fed to the input port of the A/D converter circuit 29 via the analog switch 27. The temperature detected by the temperature sensor 22 is subjected to A/D conversion before being transmitted to the ECU 37. Accordingly, temperature detection is made when the temperature detected by the temperature sensor 22 shows a high value when the FET 8 generates a high heat immediately after the FET 8 is turned off.

Then, when the select signal c outputted by the selector 30 becomes active, the output signal of the operational amplifier 17 is fed to the input port of the A/D converter circuit 29 via the analog switch 28. The voltage VB is subjected to A/D conversion before being transmitted to the ECU 37.

Figure 6:
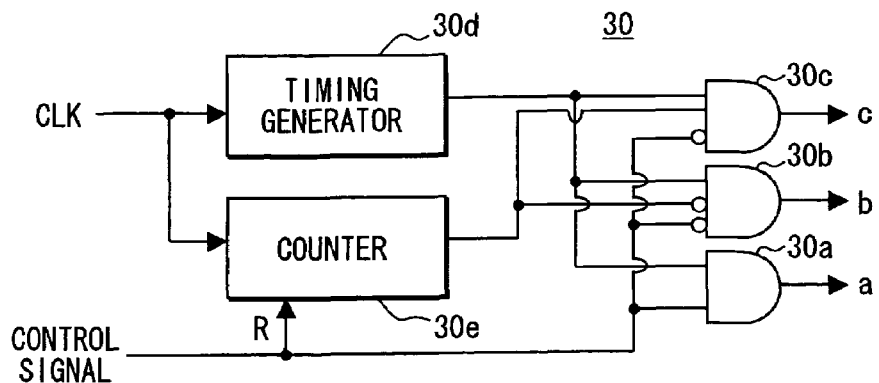
FIG. 6 is an electric circuit diagram showing a selector.

The selector 30 may be constructed as shown in FIG. 6 to produce the select signals a, b and c as shown in FIG. 7. Specifically, the selector 30 includes AND gates 30*a*, 30*b*, 30*c*, a timing signal generator 30*d* and a counter 30R. The generator 30*d* frequency-divides clock signals CLK to generate a timing signal at a fixed frequency, which is applied to the AND gates 30*a*, 30*b*, 30*c*. The AND gate 30*a* generates the select signal a in response to the timing signal when the control signal is high, that is. The FET 8 is ON.

The counter 30*e* counts the clock signals CLK after the control signal changes from high to low and generates a high level output "1" after counting a predetermined number of clock signals CLK. The counter 30*e* may count the timing signal in place of the clock signals CLK. The AND gate generates the select signal b in response to the timing signal, when the control signal is low and the output of the counter 30*e* is low ("0"). The AND gate 30*c* generates the select signal c in response to the timing signal, when the control signal is low and the output of the counter 30*e* is high ("1").

Figure 5A:
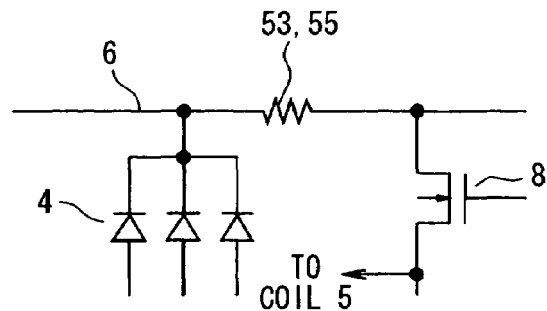
FIG. 5A is an electric circuit diagram showing an equivalent circuit of a power supply line in the embodiment.
Figure 5B:
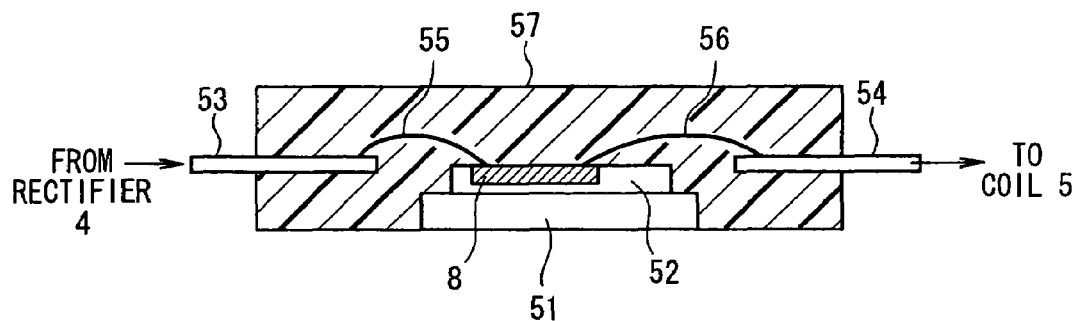
FIG. 5B is a schematic sectional view showing a semiconductor structure of an FET in the embodiment.

The FET 8 is formed, as shown in FIG. 5B, on a semiconductor substrate 52 fixed onto a heat sink 51. The drain and the source regions of the FET 8 are bonded by leads 53 and 54 being external terminals, and wires 55 and 56. The whole of the FET 8 is molded with a resin 57.

As a result, as shown in FIG. 5A, the power line 6 includes resistance components such as the lead 53 and the wire 55, when the FET 8 turns on and the exciting coil 5 is energized. Therefore, the source voltage VB decreases due to the above resistance components. Therefore, detection of the source voltage VB is made in a period during which, as shown in (c) of FIG. 4, the FET 8 is in the OFF state. In this state, the exciting coil 5 is not energized, and voltage drop does not develop in the voltage VB as shown in (e) of FIG. 4.

As described above, according to this embodiment, the current flowing through the exciting coil 5 of the generator 2 is detected as an analog voltage signal by the FET 9 and the resistor 11. Further, the source voltage VB and the temperature of the regulator 1 that change as a current is fed to the exciting coil 5 are detected as analog voltage signals by the resistors 14 and 15, and the temperature sensor 22, respectively. When these analog voltage signals are subjected to A/D conversion by the common or single A/D converter circuit 29, the detected voltage signal for the current is subjected to A/D conversion in a period during which the FET 8 is ON, while the voltage signals corresponding to the voltage VB and temperature are subjected to A/D conversion in a period during which the FET 8 is OFF. That is, since one A/D converter circuit 29 can subject plural analog voltage signals to A/D conversion in time-divided manner, an increase in a circuit scale of the regulator 1 can be suppressed, contributing to an increase in reliability and reduction in costs.

Since the voltage VB and temperature are subjected to A/D conversion in a period during which the FET 8 is OFF and no active current is fed to the exciting coil 5, the current can hardly become a cause of disturbance, so that detection accuracy can be increased. The analog detected signals of the voltage VB and temperature are adjusted by the operational amplifiers 23 and 17 so that a voltage level falls within a predetermined range. Therefore, input to the A/D converter circuit 29 is adjusted to fall within approximately the same range so that the A/D conversion can be efficiently performed.

Furthermore, according to this embodiment, an operation power supply of the A/D converter circuit 29, and an operation power supply of the operational amplifiers 12, 17 and 23 are used in common as the power supply VCC. Therefore, even when the power source 7 has temperature characteristics, their influence is canceled and does not extend to only the A/D conversion 29, so that detection accuracy can be increased.

Since the operational amplifiers 12, 17, and 23 are respectively formed in trench-separated areas on the SOI substrate 42, their close disposition exerts no influence on mutual amplification operation, so that the circuit size can be made smaller. Furthermore, since they are closely disposed in a range in which their respective operating temperatures are substantially equal, their amplification operations can be stabilized to eliminate variations in amplification.

The CPU 40 of the ECU 37 calculates the current value I by averaging A/D conversion values obtained during two current detections immediately after the FET 8 is turned on, and immediately before it is turned off. As a result, even when current values fluctuate due to the inductance of the exciting coil 6, an appropriate value can be detected. Additionally, since digital data converted by the A/D converter circuit 29 is transmitted to the ECU 37 by serial communication via the communication driver 50, noise generated during operation of the regulator 1 is less likely to exert influence on the data transmission path. Furthermore, the regulator 1 and the CPU 40 are disposed separately from each other, thereby reducing thermal influence during operation of the regulator 1 from extending to the CPU 40.

The present invention is not limited to only the above embodiment, but may be modified in many other ways.

For instance, a control circuit that outputs the control signals to the FET 8 may be the ECU 37 or a control circuit different from the ECU 37. The switching element for the exciting coil 5 is not limited to the N-channel MOSFET 8, but may be a P-channel MOSFET, a bipolar transistor or IGBT.

A function of current calculation performed by the CPU 40 may be included in the regulator 1. Accordingly, a function for performing serial communication may be provided as required. The inductive load is not limited to the exciting coil 5 of the electric power generator 2 of the vehicle. State amounts being detection targets other than currents are not limited to voltages and temperatures.

What is claimed is:

1. A signal detecting device for a load driving apparatus that controls a current to an inductive load by intermitting a current by a switching element to drive the load, the signal detecting device comprising:

current detecting means that detects the current flowing through the load and produces an analog current voltage signal indicative of the detected current;

state amount detecting means that detects a state amount other than the current, which changes as the load is driven, and produces an analog state voltage signal indicative of the detected state amount;

an A/D converter circuit that subjects the current voltage signal and the state voltage signal to A/D conversion; and selector means that selects the current voltage signal detected by the current detecting means to be subjected to A/D conversion by the A/D converter circuit in an ON period during which the switching element is ON, and selects the state voltage signal to be subjected to A/D conversion by the A/D converter circuit in an OFF period during which the switching means is OFF.

2. The signal detecting device according to claim 1, wherein the A/D converter circuit is common to the current voltage signal and the state voltage signal; and wherein the state amount detecting means detects either of a power source voltage and temperature of the switching element.

3. The signal detecting device according to claim 1, further comprising:
an amplifier that adjusts levels of the current voltage signal and the state voltage signal within a predetermined range.

4. The signal detecting device according to claim 3, wherein the A/D converter circuit and the amplifier is operated with the same operation power supply.

5. The signal detecting device according to claim 3, wherein the state amount detecting means and the amplifier are provided for each of a plurality of state amounts to be detected, and a plurality of amplifiers are formed on a semiconductor substrate and insulated from each other.

6. The signal detecting device according to claim 5, wherein the plurality of amplifiers are closely disposed in a range in which respective operating temperatures are substantially equal.

7. The signal detecting device according to claim 1, further comprising:
current value calculating means that performs current detection twice, one being immediately after the switching means is turned on and the other immediately before the switching means is turned off, and average two detection results to obtain a current value.

8. The signal detecting device according to claim 1, further comprising:
transmitting means that transmits digital data of the A/D converter circuit by serial communication to a determining part including a CPU that uses the data to perform determination processing.

9. A signal detecting method for a load driving apparatus that controls a current to an inductive load by intermitting a current by a switching element to drive the load, method comprising:
detecting the current supplied to the load;
detecting a state amount other than the current, which changes as the load is driven;
converting the detected current and the detected state amount by a single A/D converter circuit; and
selecting the detected current voltage for A/D conversion by the A/D converter circuit while the switching element is turned on and selecting the detected state amount for A/D conversion by the A/C converter circuit while the switching element is turned off.

10. The signal detecting method according to claim 9, wherein the detecting of state amount includes detecting a plurality of parameters including at least a temperature of the switching element other than the current, and the selecting selects the detected parameters at different time points during the switching element is turned off.

11. A signal detecting method for a load driving apparatus that controls a current to an inductive load by intermitting a current by a switching element to drive the load, method comprising:
detecting the current supplied to the load;
detecting a state amount other than the current, which changes as the load is driven;
converting the detected current and the detected state amount by a single A/D converter circuit; and
selecting the detected current voltage and the detected state amount for A/D conversion by the A/C converter circuit while the switching element is turned on and off, respectively,
wherein the detecting of state amount includes detecting a plurality of parameters including at least a temperature of the switching element other than the current, and the selecting selects the detected parameters at different time points while the switching element is turned off.

* * * * *